(12) United States Patent
Maddox et al.

(10) Patent No.: US 6,465,386 B1
(45) Date of Patent: Oct. 15, 2002

(54) POLYMERIZATION CATALYST

(75) Inventors: Peter James Maddox, Staines (GB); Stephen Roy Partington, Walton on Thames (GB)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 09/690,477

(22) Filed: Oct. 18, 2000

Related U.S. Application Data

(63) Continuation of application No. PCT/GB00/00835, filed on Mar. 8, 2000.

(30) Foreign Application Priority Data

Mar. 18, 1999 (GB) ................................ 9906296

(51) Int. Cl.⁷ ............................ B01J 31/18; B01J 31/38; C08F 4/44
(52) U.S. Cl. ...................... 502/155; 502/152; 502/167; 502/117; 502/104; 526/115; 526/116; 526/160; 526/161; 526/172
(58) Field of Search ................................. 526/113, 117, 526/115, 116, 172, 160, 161; 502/104, 117, 152, 155, 167, 168

(56) References Cited

U.S. PATENT DOCUMENTS 6,214,761 B1 * 4/2001 Bennett ...................... 502/117

FOREIGN PATENT DOCUMENTS

| WO | WO 98/30612 | 7/1998 |
| WO | WO 99/50318 | 10/1999 |
| WO | WO 00/12568 | 3/2000 |

OTHER PUBLICATIONS

S. Mecking, "Reactor Blending with Early/Late Transition Metal Catalyst Combinations in Ethylene Polymerization", Macromol. Rapid Commun., vol. 20, No. 3, pp. 139–143, (1999).

* cited by examiner

*Primary Examiner*—David W. Wu
*Assistant Examiner*—R. Harlan
(74) *Attorney, Agent, or Firm*—Finnegan, Henderson, Farabow, Garrett and Dunner, L.L.P.

(57) ABSTRACT

A polymerization catalyst comprising
(1) a catalyst having a compound of the Formula (I):

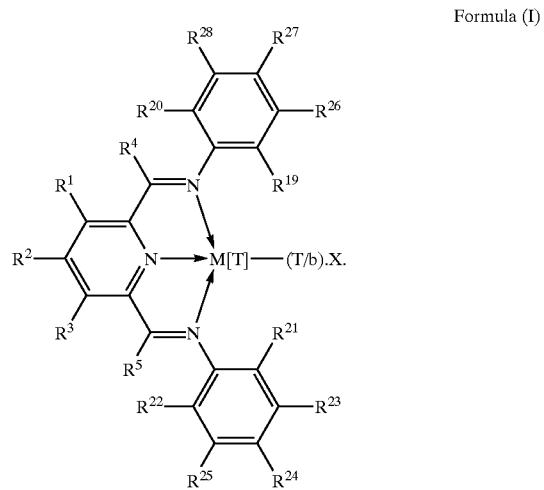

Formula (I)

(2) a further catalyst for the polymerization of 1-olefins which is different from catalyst (1).

25 Claims, No Drawings

POLYMERIZATION CATALYST

This application is a Continuation of International Application Number PCT/GB00/00835, filed Mar. 8, 2000.

The present invention relates to novel transition metal compounds and to their use as polymerisation catalysts.

The use of certain transition metal compounds to polymerise 1-olefins, for example, ethylene, is well established in the prior art. The use of Ziegler-Natta catalysts, for example, those catalysts produced by activating titanium halides with organometallic compounds such as triethylaluminium, is fundamental to many commercial processes for manufacturing polyolefins. Over the last twenty or thirty years, advances in the technology have led to the development of Ziegler-Natta catalysts which have such high activities that that olefin polymers and copolymers containing very low concentrations of residual catalyst can be produced directly in commercial polymerisation processes. The quantities of residual catalyst remaining in the produced polymer are so small as to render unnecessary their separation and removal for most commercial applications. Such processes can be operated by polymerising the monomers in the gas phase, or in solution or in suspension in a liquid hydrocarbon diluent. Polymerisation of the monomers can be carried out in the gas phase (the "gas phase process"), for example by fluidising under polymerisation conditions a bed comprising the target polyolefin powder and particles of the desired catalyst using a fluidising gas stream comprising the gaseous monomer. In the so-called "solution process" the (co)polymerisation is conducted by introducing the monomer into a solution or suspension of the catalyst in a liquid hydrocarbon diluent under conditions of temperature and pressure such that the produced polyolefin forms as a solution in the hydrocarbon diluent. In the "slurry process" the temperature, pressure and choice of diluent are such that the produced polymer forms as a suspension in the liquid hydrocarbon diluent. These processes are generally operated at relatively low pressures (for example 10–50 bar) and low temperature (for example 50 to 150° C.).

Commodity polyethylenes are commercially produced in a variety of different types and grades. Homopolymerisation of ethylene with transition metal based catalysts leads to the production of so-called "high density" grades of polyethylene. These polymers have relatively high stiffness and are useful for making articles where inherent rigidity is required. Copolymerisation of ethylene with higher 1-olfins (e.g. butene, hexene or octene) is employed commercially to provide a wide variety of copolymers differing in density and in other important physical properties. Particularly important copolymers made by copolymerising ethylene with higher 1-olefins using transition metal based catalysts are the copolymers having a density in the range of 0.91 to 0.93. These copolymers which are generally referred to in the art as "linear low density polyethylene" are in many respects similar to the so called "low density" polyethylene produced by the high pressure free radical catalysed polymerisation of ethylene. Such polymers and copolymers are used extensively in the manufacture of flexible blown film.

An important feature of the microstructure of the copolymers of ethylene and higher 1-olfins is the manner in which polymerised comonomer units are distributed along the "backbone" chain of polymerised ethylene units. The conventional Ziegler-Natta catalysts have tended to produce copolymers wherein the polymerised comonomer units are clumped together along the chain. To achieve especially desirable film properties from such copolymers the comonomer units in each copolymer molecule are preferably not clumped together, but are well spaced along the length of each linear polyethylene chain. In recent years the use of certain metallocene catalysts (for example biscyclopentadienylzirconiumdichloride activated with alumoxane) has provided catalysts with potentially high activity and capable of providing an improved distribution of the comonomer units. However, metallocene catalysts of this type suffer from a number of disadvantages, for example, high sensitivity to impurities when used with commercially available monomers, diluents and process gas streams, the need to use large quantities of expensive alumoxanes to achieve high activity, and difficulties in putting the catalyst on to a suitable support.

WO99/02472 and Small, et al, J.Am.Chem. Soc, vol 120, pp 7143–4 (1998) disclose that ethylene may be polymerised to form α-olefins by contacting it with iron complexes of selected 2,6-pyridinecarboxaldehydebis (imines) and 2,6-diacylpyridinebis(imines). Copending applications WO99/46302 and WO99/50318 both disclose polymerisation catalysts comprising such complexes in combination a further catalyst which may for example be a Ziegler Natta catalyst, a Phillips type (chromium oxide) catalyst, a metallocene catalyst, a monocyclopentadienyl constrained geometry type catalyst or a bidentate α-diimine late transition metal catalyst. As an example of the above-mentioned iron complexes, WO99/50318 discloses such complexes in combination with certain metallocene or monocyclopentadienyl constrained geometry type catalysts, of which the specific combinations of 2,6-diacetylpyridinebis(2-methylanil)FeCl$_2$ with each of the following four compounds have a priority date earlier than that of the present invention:

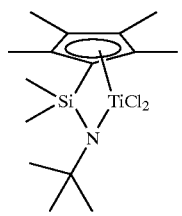

1,1-Dimethylsilyl(1-tetramethylcyclopentadienyl)(1-t-butylamino)titanium dichloride,

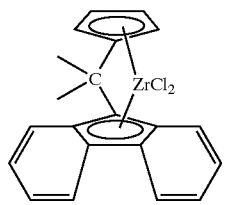

Propane-2,2-[(cyclopentadienyl)(1-fluorenyl)]zirconium dichloride,

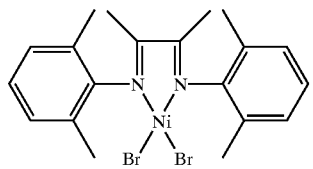

Butane-2,3-(2,6-dimethylphenyl-1-imino)nickel dibromide, and 2,6-diacetylpyridinebis(2,4,6-trimethylanil)FeCl$_2$.

An object of the present invention is to provide a novel catalyst system suitable for polymerising monomers, for example, olefins, and especially for polymerising ethylene alone to form polyethylene varying from HDPE to LLDPE. A further object of the invention is to provide an improved process for the polymerisation of olefins, especially of ethylene alone or the copolymerisation of ethylene with higher 1-olefins to provide homopolymers and copolymers having controllable molecular weights. A particular object of the invention is to produce LLDPE by the polymerisation of ethylene alone.

We have discovered a novel catalyst system one component of which is capable of producing α-olefins in situ, and a second component of which copolymerises the α-olefins with ethylene to form polyethylene containing short chain branching.

By "α-olefin" in this specification is meant a compound of the formula $H(CH_2CH_2)_nCH=CH_2$ where n is an integer from 1 to 20. The term "α-olefins" encompasses mixtures of such compounds, which may additionally include compounds where n is greater than 20.

Accordingly the present invention provides in one aspect a polymerisation catalyst comprising
(1) a catalyst comprising a compound of the Formula (I):

Formula (I)

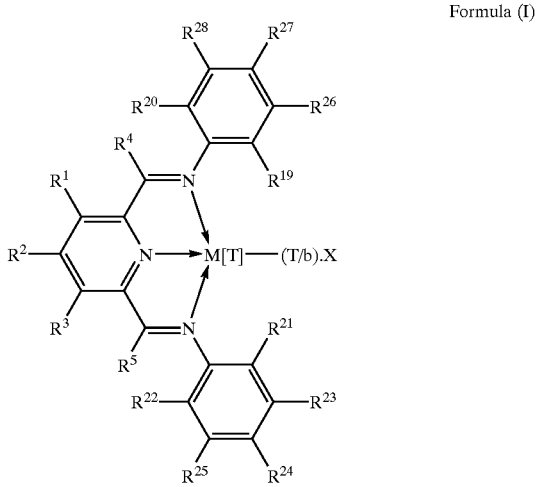

wherein
M is Fe[II], Fe[III], Co[I], Co[II], Co[III], Mn[I], Mn[II], Mn[III], Mn[IV], Ru[II], Ru[III] or Ru[IV]; X represents an atom or group covalently or ionically bonded to the transition metal M; T is the oxidation state of the transition metal M and b is the valency of the atom or group X; $R^1$ to $R^5$ and $R^{23}$ to $R^{28}$ are independently selected from hydrogen, halogen, hydrocarbyl, substituted hydrocarbyl, heterohydrocarbyl or substituted heterohydrocarbyl; $R^{19}$ is an optionally substituted primary, secondary or tertiary hydrocarbyl or heterohydrocarbyl group;
when $R^{19}$ is an optionally substituted primary hydrocarbyl or heterohydrocarbyl group, one of $R^{20}$ to $R^{22}$ is hydrogen and the others are each independently hydrogen, halogen or an optionally substituted primary hydrocarbyl or heterohydrocarbyl group;
when $R^{19}$ is an optionally substituted secondary hydrocarbyl or heterohydrocarbyl group, two of $R^{20}$ to $R^{22}$ are hydrogen and the other is hydrogen, halogen or an optionally substituted primary or secondary hydrocarbyl or heterohydrocarbyl group;
when $R^{19}$ is an optionally substituted tertiary hydrocarbyl or heterohydrocarbyl group, $R^{20}$ to $R^{22}$ are all hydrogen;
and any two or more of $R^{19}$ to $R^{28}$ can be linked to form one or more cyclic substituents; and
(2) a further catalyst for the polymerisation of 1-olefins which is different from catalyst (1).

In one embodiment, the following combinations of catalyst (1) and (2) are excluded:
the case where catalyst (1) is 2,6-diacetylpyridinebis(2-methylanil)FeCl$_2$, and catalyst (2) is one of the following:
1,1-dimethylsilyl(1-tetramethylcyclopentadienyl)(1-t-butylamino)titanium dichloride,
propane-2,2-[(cyclopentadienyl)(1-fluorenyl)]zirconium dichloride, butane-2,3-(2,6-dimethylphenyl-1-imino) nickel dibromide,
and 2,6-diacetylpyridinebis(2,4,6-trimethylanil)FeCl$_2$.

In an alternative embodiment, catalyst (1) is not 2,6-diacetylpyridinebis(2-methylanil)FeCl$_2$ , 2,6-diacetylpyridinebis(2-ethylanil)FeCl$_2$ or 2,6-diacetylpyridinebis(2-i-propylanil)FeCl$_2$.

Preferably catalyst (2) comprises a Ziegler Natta catalyst, a Phillips type (chromium oxide) catalyst, a metallocene catalyst, a monocyclopentadienyl constrained geometry type catalyst or a bidentate α-diimine late transition metal catalyst, wherein the molar ratio of metal in catalyst (1) to metal in catalyst (2) is from 1:10000 to 2:1.

It is preferred that the molar ratio of metal in catalyst (1) to metal in catalyst (2) is from 1:1000 to 1:1, and more preferably from 1:100 to 1:1. The precise ratio of catalysts required depends on the relative reactivity of the catalysts, and also on the desired density range of the product. It is preferred that the molar ratio of metal in catalyst (1) to metal in catalyst (2) is such that the final polyethylene product contains less than 1 wt % of low $M_w$ waxes, such that the GPC of the product contains no peak at an $M_w$ of less than 5000.

The polymerisation catalyst of the invention is capable of producing polymers having relatively low densities by virtue of the incorporation of the α-olefin generated as a result of the presence of catalyst (1) into the polyethylene formed as a result of the presence of catalyst (2). Accordingly a further aspect of the invention is polyethylene containing $C_2$, $C_4$ and $C_6$ or greater short chain branches.

By "primary hydrocarbyl group" is meant a hydrocarbyl group in which the carbon attached to the benzene ring is a primary carbon—i.e. the hydrocarbyl group has the structure —CH$_2$R where R is halogen, hydrogen or a straight or branched chain optionally substituted hydrocarbyl or heterohydrocarbyl. Examples of such primary hydrocarbyl groups include —CH$_3$, —CH$_2$CH(CH$_3$)$_2$, —CH$_2$Cl, —CH$_2$C$_6$H$_5$ and —CH$_2$OCH$_3$.

In a "secondary hydrocarbyl group" the carbon attached to the benzene ring is a secondary carbon, and the hydrocarbyl group has the structure —CHRR' where R and R' are independently halogen or a straight or branched chain optionally substituted hydrocarbyl or heterohydrocarbyl. Examples of such secondary hydrocarbyl groups include —CH(CH$_3$)$_2$, —CHCl$_2$, —CH(C$_6$H$_5$)$_2$, —CH=CCH$_3$, cyclohexyl and —CH(CH$_3$)OCH$_3$.

In a "tertiary hydrocarbyl group" the carbon attached to the benzene ring is a tertiary carbon, and the hydrocarbyl group has the structure —CRR'R" where R, R' and R" are independently halogen or a straight or branched chain optionally substituted hydrocarbyl or heterohydrocarbyl. Examples of such secondary hydrocarbyl groups include —C(CH$_3$)$_3$, —CCl$_3$, —C(C$_6$H$_5$)$_3$, —C≡CH, 1-adamantyl, cyclohexyl, —C(CH$_3$)CH=CH$_2$ and —C(CH$_3$)$_2$OCH$_3$.

A typical Phillips type catalyst employs a combination of a support material to which has first been added a chromium-containing material wherein at least part of the chromium is in the hexavalent state by heating in the presence of molecular oxygen. The support is generally composed of about 80 to 100 wt. % silica, the remainder, if any, being selected from the group consisting of refractory metal oxides, such as aluminium, boria, magnesia, thoria, zirconia, titania and mixtures of two or more of these refractory metal oxides. Supports can also comprise alumina, aluminium phosphate, boron phosphate and mixtures thereof with each other or with silica.

The chromium compound is typically added to the support as a chromium (III) compound such as the acetate or acetylacetonate in order to avoid the toxicity of chromium (VI). The raw catalyst is then calcined in air at a temperature between 250 and 1000° C. for a period of from a few seconds to several hours. This converts at least part of the chromium to the hexavalent state. Reduction of the Cr VI to its active form normally occurs in the polymerisation reaction, but can be done at the end of the calcination cycle with CO at about 350° C.

Fluorine, aluminium and/or titanium may be added to the raw Phillips catalyst to modify it.

Metallocenes may typically be represented by the general formula:

where $(C_5R_x)_n$ and $(C_5R_m)$ are cyclopentadienyl ligands,

R is hydrogen, alkyl, aryl, alkenyl, etc.

M is a Group IVA metal

Z is a bridging group,

L is an anionic ligand, and y is 0, 1 or 2, n and m are 1–5, x is 0 or 1.

The most preferred complexes are those wherein y is 1 and L is halide or alkyl. Typical examples of such complexes are bis(cyclopentadienyl)zirconium dichloride and bis (cyclopentadienyl zirconium dimethyl. In such metallocene complexes the cyclopentadienyl ligands may suitably be substituted by alkyl groups such as methyl, n-butyl or vinyl. Alternatively the R groups may be joined together to form a ring substituent, for example indenyl or fluorenyl. The cyclopentadienyl ligands may be the same or different. Typical examples of such complexes are bis(n-butylcyclopentadienyl)zirconium dichloride or bis(methylcyclopentadienyl)zirconium dichloride.

Examples of monocyclopentadienyl or constrained geometry complexes may be found in EP 416815A, EP 420436A, EP 418044A and EP 491842A the disclosures of which are incorporated herein by reference. A typical example of such a monocyclopentadienyl complex is (tert-butylamido)(tetramethyl cyclopentadienyl)dimethyl silanetitanium dimethyl.

Further examples of metallocene complexes are those wherein the anionic ligand represented in the above formula is replaced with a diene moiety. In such complexes the transition metal may be in the +2 or +4 oxidation state and a typical example of this type of complex is ethylene bis indenyl zirconium (II) 1,4-diphenyl butadiene. Examples of such complexes may be found in EP 775148A the disclosure of which is incorporated herein by reference.

Monocyclopentadienyl complexes having diene moieties have also been used for the polymerisation of olefins. Such complexes may be exemplified by (tert-butylamido)(tetramethylcyclopentadienyl)dimethylsilanetitanium (II) penta-1,3-diene. Such complexes are described in EP 705269A the disclosure of which is incorporated herein by reference.

Other transition metal complexes which may comprise catalyst (2) above are complexes having hetero ring ligands attached to the transition metal, for example O, NR or S ligands. Such complexes are disclosed for example in EP 735057A and may be illustrated by indenyl zirconium tris(diethylcarbamate).

Ziegler-Natta catalysts, in general, consist of two main components. One component is an alkyl or hydride of a Group I to III metal, most commonly $Al(Et)_3$ or $Al(iBu)_3$ or $Al(Et)_2Cl$ but also encompassing Grignard reagents, n-butyllithium, or dialkylzinc compounds. The second component is a salt of a Group IV to VIII transition metal, most commonly halides of titanium or vanadium such as $TiCl_4$, $TiCl_3$, $VCl_4$, or $VOCl_3$. The catalyst components when mixed, usually in a hydrocarbon solvent, may form a homogeneous or heterogeneous product. Such catalysts may be impregnated on a support, if desired, by means known to those skilled in the art and so used in any any of the major processes known for co-ordination catalysis of polyolefins such as solution, slurry, and gas-phase. In addition to the two major components described above, minor amounts of other compounds (typically electron donors) may be added to further modify the polymerisation behaviour or activity of the catalyst. A wide variety of monomers may thus be polymerised by Ziegler-Natta catalysts. Depending on the particular components used, and the specific method of combination, it is possible to produce catalysts which are very effective for the polymerisation and copolymerisation of ethylene, dienes, and higher alpha-olefins. Particularly important applications for Ziegler-Natta catalysts are for the manufacture of high molecular weight ethylene copolymers and isotactic polypropene.

In the compound of Formula (I), it is preferred that when $R^{19}$ is an optionally substituted primary hydrocarbyl or heterohydrocarbyl group, $R^{21}$ is an optionally substituted primary hydrocarbyl or heterohydrocarbyl group and $R^{20}$ and $R^{22}$ are both hydrogen. Alternatively, when $R^{19}$ is an optionally substituted secondary hydrocarbyl or heterohydrocarbyl group, it is preferred that $R^{21}$ is an optionally substituted primary or secondary hydrocarbyl or heterohydrocarbyl group and $R^{20}$ and $R^{22}$ are both hydrogen.

It is preferred generally that $R^4$ and $R^5$ are independently methyl or hydrogen. $R^1$, $R^2$ and $R^3$ and $R^{23}$ to $R^{28}$ are preferably all hydrogen. $R^{19}$ and $R^{21}$ are both preferably hydrogen, and $R^{20}$ and $R^{22}$ are preferably independently methyl, ethyl, trifluoromethyl, propyl or isopropyl, most preferably methyl or ethyl.

The atom or group represented by X in the compounds of Formula (I) can be, for example, selected from halide, sulphate, nitrate, thiolate, thiocarboxylate, $BF_4^-$, $PF_6^-$, hydride, hydrocarbyloxide, carboxylate, hydrocarbyl, substituted hydrocarbyl and heterohydrocarbyl, or β-diketonates. Examples of such atoms or groups are chloride, bromide, methyl, ethyl, propyl, butyl, octyl, decyl, phenyl, benzyl, methoxide, ethoxide, isopropoxide, tosylate, triflate, formate, acetate, phenoxide and benzoate. Preferred examples of the atom or group X in the compounds of Formula (I) are halide, for example, chloride, bromide; hydride; hydrocarbyloxide, for example, methoxide, ethoxide, isopropoxide, phenoxide; carboxylate, for example, formate, acetate, benzoate; hydrocarbyl, for example, methyl, ethyl, propyl, butyl, octyl, decyl, phenyl, benzyl; substituted hydrocarbyl; heterohydrocarbyl; tosylate; and triflate. Preferably X is selected from halide, hydride and hydrocarbyl. Chloride is particularly preferred.

Preferred metals M in the nitrogen-containing transition metal complex (1) are Fe[II] and Fe[III].

The following are examples of nitrogen-containing transition metal complexes (1):
2,6-diacetylpyridinebis(2,3-dimethylanil)FeCl$_2$
2,6-diacetylpyridinebis(2-methylanil)FeCl$_2$
2,6-diacetylpyridinebis(2-ethylanil)FeCl$_2$
2,6-diacetylpyridinebis(2-isopropylanil)FeCl$_2$
2,6-diacetylpyridinebis(2,4-dimethylanil)FeCl$_2$ The catalysts of the present invention can be unsupported or supported on a support material, for example, silica, alumina, MgCl$_2$ or zirconia, or on a polymer or prepolymer, for example polyethylene, polypropylene, polystyrene, or poly(aminostyrene).

The further catalyst (2) preferably comprises a heterogeneous catalyst or a supported catalyst which provides a support for the catalyst (1). It is preferred that the catalyst additionally incorporates (3) an activating quantity of an activator compound comprising a Lewis acid capable of activating the catalyst for olefin polymerisation, preferably an organoaluminium compound or a hydrocarbylboron compound.

The activator compound for the catalysts of the present invention is suitably selected from organoaluminium compounds and hydrocarbylboron compounds. Suitable organoaluminium compounds include trialkyaluminium compounds, for example, trimethylaluminium, triethylaluminium, tributylaluminium, tri-n-octylaluminium, ethylaluminium dichloride, diethylaluminium chloride and alumoxanes. Alumoxanes are well known in the art as typically the oligomeric compounds which can be prepared by the controlled addition of water to an alkylaluminium compound, for example trimethylaluminium. Such compounds can be linear, cyclic or mixtures thereof. Commercially available alumoxanes are generally believed to be mixtures of linear and cyclic compounds. The cyclic alumoxanes can be represented by the formula $[R^{16}AlO]_s$ and the linear alumoxanes by the formula $R^{17}(R^{18}AlO)_s$ wherein s is a number from about 2 to 50, and wherein $R^{16}$, $R^{17}$, and $R^{18}$ represent hydrocarbyl groups, preferably $C_1$ to $C_6$ alkyl groups, for example methyl, ethyl or butyl groups.

Examples of suitable hydrocarbylboron compounds are dimethylphenylammoniumtetra(phenyl)borate, trityltetra(phenyl)borate, triphenylboron, dimethylphenylammonium tetra(pentafluorophenyl)borate, sodium tetrakis[(bis-3,5-trifluoromethyl)phenyl]borate, $H^+(OEt_2)[(bis-3,5-trifluoromethyl)phenyl]$borate, trityltetra(pentafluorophenyl)borate and tris(pentafluorophenyl)boron.

In the preparation of the catalysts of the present invention the quantity of activating compound selected from organoaluminium compounds and hydrocarbylboron compounds to be employed is easily determined by simple testing, for example, by the preparation of small test samples which can be used to polymerise small quantities of the monomer(s) and thus to determine the activity of the produced catalyst. It is generally found that the quantity employed is sufficient to provide 0.1 to 20,000 atoms, preferably 1 to 2000 atoms of aluminium or boron per Fe atom in the compound of Formula (I). In certain instances, for example when catalyst (2) is a supported metallocene, no additional activator is needed, as the metallocene already contains alumoxane.

In one embodiment of the invention, catalyst (1) and catalyst (2) can be impregnated on a support, either together or sequentially. Alternatively, catalyst (1) is supported on a heterogeneous catalyst as catalyst (2), for example, a magnesium halide supported Ziegler Natta catalyst, a Phillips type (chromium oxide) supported catalyst or a supported metallocene catalyst. Formation of the supported catalyst can be achieved for example by treating catalyst (1) with alumoxane in a suitable inert diluent, for example a volatile hydrocarbon, slurrying a heterogeneous catalyst (2) with the product and evaporating the volatile diluent. Alternatively, catalyst (1) may be slurried in a suitable diluent with a heterogeneous catalyst (2), and then alumoxane added, after which the diluent is evaporated. Generally, the support may optionally be slurried with the alumoxane prior to addition of catalysts (1) and (2) in either order: or either of the two catalysts may be mixed with the alumoxane and support prior to addition of the other catalyst. In a further alternative each catalyst is impregnated on a separate support prior to mixing. The quantity of support material employed can vary widely, for example from 100,000 to 1 grams per gram of metal present in the catalysts (1) and (2).

Examples of the atom or group X in the compounds of formula (I) are halide, for example, chloride, bromide; iodide; hydride; hydrocarbyloxide, for example, methoxide, ethoxide, isopropoxide, phenoxide; carboxylate, for example, formate, acetate, benzoate; hydrocarbyl, for example, methyl, ethyl, propyl, butyl, octyl, decyl, phenyl, benzyl; substituted hydrocarbyl; heterohydrocarbyl; tosylate; and triflate. Preferably X is selected from halide, hydride and hydrocarbyl. Chloride is particularly preferred.

A particularly preferred embodiment of the present invention comprises a polymerisation catalyst additionally comprising (3) an activating quantity of an activator compound comprising a Lewis acid capable of activating the catalyst for olefin polymerisation, preferably an organoaluminium compound or a hydrocarbylboron compound.

In a further aspect of the present invention the polymerisation catalyst system additionally comprises (4) a neutral Lewis base.

Neutral Lewis bases are well known in the art of Ziegler-Natta catalyst polymerisation technology. Examples of classes of neutral Lewis bases suitably employed in the present invention are unsaturated hydrocarbons, for example, alkenes or alkynes, primary, secondary and tertiary amines, amides, phosphoramides, phosphines, phosphites, ethers, thioethers, nitriles, carbonyl compounds, for example, esters, ketones, aldehydes, carbon monoxide and carbon dioxide, sulphoxides, sulphones and boroxines. Although 1-olefins are capable of acting as neutral Lewis bases, for the purposes of the present invention they are regarded as monomer or comonomer 1-olefins and not as neutral Lewis bases per se. However, alkenes which are internal olefins, for example, 2-butene and cyclohexene are regarded as neutral Lewis bases in the present invention. Preferred Lewis bases are tertiary amines and aromatic esters, for example, dimethylaniline, diethylaniline, tributylamine, ethylbenzoate and benzylbenzoate. In this particular aspect of the present invention, components (1), (2), (3) and (4) of the catalyst system can be brought together simultaneously or in any desired order. However, if components (3) and (4) are compounds which interact together strongly, for example, form a stable compound together, it is preferred to bring together either components (1), (2) and (3) or components (1), (2) and (4) in an initial step before introducing the final defined component. Preferably components (1), (2) and (4) are contacted together before component (3) is introduced. The quantities of components (1), (2) and (3) employed in the preparation of this catalyst system are suitably as described above in relation to the catalysts of the present invention. The quantity of the neutral Lewis Base (component (4)) is preferably such as to provide a ratio of component (1)+(2):component (4) in the range 100:1 to 1:1000, most preferably in the range 1:1 to 1:20. Components (1), (2) and (4) of the catalyst system can be brought together, for example, as the neat materials, as a suspension or solution of the materials in a suitable diluent or solvent (for example a liquid hydrocarbon), or, if at least one of the components is volatile, by utilising the vapour of that component. The components can be brought together at any desired temperature. Mixing the components together at room temperature is generally satisfactory. Heating to higher temperatures e.g. up to 120° C. can be carried out if desired, e.g. to achieve better mixing of the components. It is preferred to carry out the bringing together of components (1), (2) and (4) in an inert atmosphere (e.g. dry nitrogen) or in vacuo. If it is desired to use the catalyst on a support material (see below), this can be achieved, for example, by preforming the catalyst system comprising components (1), (2), (3) and (4) and impregnating the support material preferably with a solution thereof, or by introducing to the support material one or more of the components simultaneously or sequentially. If desired the support material itself can have the properties of a neutral Lewis base and can be employed as, or in place of, component (4). An example of a support material having neutral Lewis base properties is poly(aminostyrene) or a copolymer of styrene and aminostyrene (i.e. vinylaniline). In an alternative preferred embodiment, components (2) and (3) are mixed together prior to the addition of component (1). This is particularly preferred when catalyst (2) is itself the support, such that catalyst (1) and the activator (3) are added separately to the support. In a further alternative catalyst (2) and activator (3) are added separately to catalyst (1).

The present invention further provides a process for the polymerisation or copolymerisation of 1-olefins, comprising contacting the monomeric olefin(s) under polymerisation conditions with a polymerisation catalyst comprising (1) a compound of Formula (I) as defined above, and a further catalyst (2) as defined above, wherein the molar ratio of metal in catalyst (1) to metal in catalyst (2) is from 1:10000 to 2:1, but excluding the case where catalyst (1) is 2,6-diacetylpyridinebis(2-methylanil)FeCl$_2$, and catalyst (2) is one of the following:

1,1-dimethylsilyl(1-tetramethylcyclopentadienyl)(1-t-butylamino)titanium dichloride, propane-2,2-[(cyclopentadienyl)(1-fluorenyl)]zirconium dichloride, butane-2,3-(2,6-dimethylphenyl-1-imino) nickel dibromide, and 2,6-diacetylpyridinebis(2,4,6-trimethylanil)FeCl$_2$.

A preferred process comprises the homopolymerisation of ethylene. In an alternative process, ethylene is copolymerised with an amount of butene, hexene or octene less than that required to give the same density product made by copolymerisation of ethylene with butene, hexene or octene in the presence of catalyst (2) alone.

In one embodiment the process of the invention comprises the initial step of preparing a prepolymer-based catalyst by contacting one or more 1-olefins with the polymerisation catalyst of the present invention, followed by contacting the prepolymer-based catalyst with one or more 1-olefins.

The catalysts (1) and (2) may be contacted with the olefin to be polymerised in the form of a single catalyst system (see earlier), or they may be added to the reactor separately. If added separately, both catalysts (1) and (2) may independently either be supported or be a homogeneous catalyst. They may be added to different parts of the reactor system.

The polymers and copolymers of the invention are preferably made in the form of a powder, the particle size of which may be from 0.1 to 18 mm diameter. Pellets may also be made, having a diameter of 0.2 to 30 mm.

A preferred process comprises the steps of:
a) preparing a prepolymer-based catalyst by contacting one or more 1-olfins with a catalyst as defined above, and
b) contacting the prepolymer-based catalyst with one or more 1-olefins.

In the text hereinbelow, the term "catalyst" is intended to include "prepolymer-based catalyst" as defined above.

The polymerisation conditions can be, for example, solution phase, slurry phase, gas phase or bulk phase, with polymerisation temperatures ranging from −100° C. to +300° C., and at pressures of atmospheric and above, particularly from 140 to 4100 kPa. If desired, the catalyst can be used to polymerise ethylene under high pressure/high temperature process conditions wherein the polymeric material forms as a melt in supercritical ethylene. Preferably the polymerisation is conducted under gas phase fluidised bed or stirred bed conditions.

Suitable monomers for use in the polymerisation process of the present invention are, for example, ethylene and $C_{2-20}$ α-olefins, specifically propylene, 1-butene, 1-pentene, 1-hexene, 4-methylpentene-1, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, and 1-eicosene. Other monomers include methyl methacrylate, methyl acrylate, butyl acrylate, acrylonitrile, vinyl acetate, and styrene. Preferred monomers for homopolymerisation processes are ethylene and propylene.

The catalysts and process of the invention can also be used for copolymerising ethylene or propylene with each other or with other 1-olfins such as 1-butene, 1-hexene, 4-methylpentene-1, and octene, or with other monomeric materials, for example, methyl methacrylate, methyl acrylate, butyl acrylate, acrylonitrile, vinyl acetate, and styrene. Polymerisation of 1-olfins with dienes, particularly non-conjugated dienes, such as 1,4 pentadiene, 1,5-hexadiene, cyclopentadiene and ethylene norbornadiene is also possible. In particular, ethylene/1-olefin/diene terpolymers may be made by the process of the invention where the diene is as above and the other 1-olefin is preferably propylene.

Irrespective of the polymerisation or copolymerisation technique employed, polymerisation or copolymerisation is typically carried out under conditions that substantially exclude oxygen, water, and other materials that act as catalyst poisons. Also, polymerisation or copolymerisation can be carried out in the presence of additives to control polymer or copolymer molecular weights.

The use of hydrogen gas as a means of controlling the average molecular weight of the polymer or copolymer applies generally to the polymerisation process of the present invention. For example, hydrogen can be used to reduce the average molecular weight of polymers or copolymers prepared using gas phase, slurry phase, bulk phase or solution phase polymerisation conditions. The quantity of hydrogen gas to be employed to give the desired average molecular weight can be determined by simple "trial and error" polymerisation tests.

The polymerisation process of the present invention provides polymers and copolymers, especially ethylene polymers, at remarkably high productivity (based on the amount of polymer or copolymer produced per unit weight of complex employed in the catalyst system). This means that relatively very small quantities of transition metal complex are consumed in commercial processes using the process of the present invention. It also means that when the polymerisation process of the present invention is operated under polymer recovery conditions that do not employ a catalyst separation step, thus leaving the catalyst, or residues thereof, in the polymer (e.g. as occurs in most commercial slurry and gas phase polymerisation processes), the amount of transition metal complex in the produced polymer can be very small.

Slurry phase polymerisation conditions or gas phase polymerisation conditions are particularly useful for the production of high or low density grades of polyethylene, and polypropylene. In these processes the polymerisation conditions can be batch, continuous or semi-continuous. Furthermore, one or more reactors may be used, e.g. from two to five reactors in series. Different reaction conditions, such as different temperatures or hydrogen concentrations may be employed in the different reactors. In the slurry phase process and the gas phase process, the catalyst is generally metered and transferred into the polymerisation zone in the form of a particulate solid either as a dry powder (e.g. with an inert gas) or as a slurry. This solid can be, for example, a solid catalyst system formed from the one or more of complexes of the invention and an activator with or without other types of catalysts, or can be the solid catalyst alone with or without other types of catalysts. In the latter situation, the activator can be fed to the polymerisation zone, for example as a solution, separately from or together with the solid catalyst. Preferably the catalyst system or the transition metal complex component of the catalyst system employed in the slurry polymerisation and gas phase polymerisation is supported on one or more support materials. Most preferably the catalyst system is supported on the support material prior to its introduction into the polymerisation zone. Suitable support materials are, for example, silica, alumina, zirconia, talc, kieselguhr, or magnesia. Impregnation of the support material can be carried out by conventional techniques, for example, by forming a solution or suspension of the catalyst components in a suitable diluent or solvent, and slurrying the support material therewith. The support material thus impregnated with catalyst can then be separated from the diluent for example, by filtration or evaporation techniques. Once the polymer product is discharged from the reactor, any associated and absorbed hydrocarbons are substantially removed, or degassed, from the polymer by, for example, pressure letdown or gas purging using fresh or recycled steam, nitrogen or light hydrocarbons (such as ethylene). Recovered gaseous or liquid hydrocarbons may be recycled to the polymerisation zone.

In the slurry phase polymerisation process the solid particles of catalyst, or supported catalyst, are fed to a polymerisation zone either as dry powder or as a slurry in the polymerisation diluent. The polymerisation diluent is compatible with the polymer(s) and catalyst(s), and may be an alkane such as hexane, heptane, isobutane, or a mixture of hydrocarbons or paraffins. Preferably the particles are fed to a polymerisation zone as a suspension in the polymerisation diluent. The polymerisation zone can be, for example, an autoclave or similar reaction vessel, or a continuous loop reactor, e.g. of the type well-know in the manufacture of polyethylene by the Phillips Process. When the polymerisation process of the present invention is carried out under slurry conditions the polymerisation is preferably carried out at a temperature above 0° C., most preferably above 15° C. The polymerisation temperature is preferably maintained below the temperature at which the polymer commences to soften or sinter in the presence of the polymerisation diluent. If the temperature is allowed to go above the latter temperature, fouling of the reactor can occur. Adjustment of the polymerisation within these defined temperature ranges can provide a useful means of controlling the average molecular weight of the produced polymer. A further useful means of controlling the molecular weight is to conduct the polymerisation in the presence of hydrogen gas which acts as chain transfer agent. Generally, the higher the concentration of hydrogen employed, the lower the average molecular weight of the produced polymer.

In bulk polymerisation processes, liquid monomer such as propylene is used as the polymerisation medium.

Methods for operating gas phase polymerisation processes are well known in the art. Such methods generally involve agitating (e.g. by stirring, vibrating or fluidising) a bed of catalyst, or a bed of the target polymer (i.e. polymer having the same or similar physical properties to that which it is desired to make in the polymerisation process) containing a catalyst, and feeding thereto a stream of monomer at least partially in the gaseous phase, under conditions such that at least part of the monomer polymerises in contact with the catalyst in the bed. The bed is generally cooled by the addition of cool gas (e.g. recycled gaseous monomer) and/or volatile liquid (e.g. a volatile inert hydrocarbon, or gaseous monomer which has been condensed to form a liquid). The polymer produced in, and isolated from, gas phase processes forms directly a solid in the polymerisation zone and is free from, or substantially free from liquid. As is well known to those skilled in the art, if any liquid is allowed to enter the polymerisation zone of a gas phase polymerisation process the quantity of liquid in the polymerisation zone is small in relation to the quantity of polymer present. This is in contrast to "solution phase" processes wherein the polymer is formed dissolved in a solvent, and "slurry phase" processes wherein the polymer forms as a suspension in a liquid diluent.

The gas phase process can be operated under batch, semi-batch, or so-called "continuous" conditions. It is preferred to operate under conditions such that monomer is continuously recycled to an agitated polymerisation zone containing polymerisation catalyst, make-up monomer being provided to replace polymerised monomer, and continuously or intermittently withdrawing produced polymer from the polymerisation zone at a rate comparable to the rate of formation of the polymer, fresh catalyst being added to the polymerisation zone to replace the catalyst withdrawn form the polymerisation zone with the produced polymer.

For typical production of impact copolymers, homopolymer formed from the first monomer in a first reactor is reacted with the second monomer in a second reactor. For manufacture of propylene/ethylene impact copolymer in a gas-phase process, propylene is polymerized in a first reactor; reactive polymer transferred to a second reactor in which ethylene or other comonomer is added. The result is an intimate mixture of a isotactic polypropylene chains with chains of a random propylene/ethylene copolymer. A random copolymer typically is produced in a single reactor in which a minor amount of a comonomer (typically ethylene) is added to polymerizing chains of propylene.

Methods for operating gas phase fluidised bed processes for making polyethylene, ethylene copolymers and polypropylene are well known in the art. The process can be operated, for example, in a vertical cylindrical reactor equipped with a perforated distribution plate to support the bed and to distribute the incoming fluidising gas stream through the bed. The fluidising gas circulating through the bed serves to remove the heat of polymerisation from the bed and to supply monomer for polymerisation in the bed. Thus the fluidising gas generally comprises the monomer(s) normally together with some inert gas (e.g. nitrogen or inert hydrocarbons such as methane, ethane, propane, butane, pentane or hexane) and optionally with hydrogen as molecular weight modifier. The hot fluidising gas emerging from the top of the bed is led optionally through a velocity reduction zone (this can be a cylindrical portion of the reactor having a wider diameter) and, if desired, a cyclone and or filters to disentrain fine solid particles from the gas stream. The hot gas is then led to a heat exchanger to remove at least part of the heat of polymerisation. Catalyst is preferably fed continuously or at regular intervals to the bed. At start up of the process, the bed comprises fluidisable polymer which is preferably similar to the target polymer. Polymer is produced continuously within the bed by the polymerisation of the monomer(s). Preferably means are provided to discharge polymer from the bed continuously or at regular intervals to maintain the fluidised bed at the desired height. The process is generally operated at relatively low pressure, for example, at 10 to 50 bars, and at temperatures for example, between 50 and 120° C. The temperature of the bed is maintained below the sintering temperature of the fluidised polymer to avoid problems of agglomeration.

In the gas phase fluidised bed process for polymerisation of olefins the heat evolved by the exothermic polymerisation reaction is normally removed from the polymerisation zone (i.e. the fluidised bed) by means of the fluidising gas stream as described above. The hot reactor gas emerging from the top of the bed is led through one or more heat exchangers wherein the gas is cooled. The cooled reactor gas, together with any make-up gas, is then recycled to the base of the bed. In the gas phase fluidised bed polymerisation process of the present invention it is desirable to provide additional cooling of the bed (and thereby improve the space time yield of the process) by feeding a volatile liquid to the bed under conditions such that the liquid evaporates in the bed thereby absorbing additional heat of polymerisation from the bed by the "latent heat of evaporation" effect. When the hot recycle gas from the bed enters the heat exchanger, the volatile liquid can condense out. In one embodiment of the present invention the volatile liquid is separated from the recycle gas and reintroduced separately into the bed. Thus, for example, the volatile liquid can be separated and sprayed into the bed. In another embodiment of the present invention the volatile liquid is recycled to the bed with the recycle gas. Thus the volatile liquid can be condensed from the fluidising gas stream emerging from the reactor and can be recycled to the bed with recycle gas, or can be separated from the recycle gas and then returned to the bed.

The method of condensing liquid in the recycle gas stream and returning the mixture of gas and entrained liquid to the bed is described in EP-A-0089691 and EP-A-0241947. It is preferred to reintroduce the condensed liquid into the bed separate from the recycle gas using the process described in our U.S. Pat. No. 5,541,270, the teaching of which is hereby incorporated into this specification.

When using the catalysts of the present invention under gas phase polymerisation conditions, the catalyst, or one or more of the components employed to form the catalyst can, for example, be introduced into the polymerisation reaction zone in liquid form, for example, as a solution in an inert liquid diluent. Thus, for example, the transition metal component, or the activator component, or both of these components can be dissolved or slurried in a liquid diluent and fed to the polymerisation zone. Under these circumstances it is preferred the liquid containing the component(s) is sprayed as fine droplets into the polymerisation zone. The droplet diameter is preferably within the range 1 to 1000 microns. EP-A-0593083, the teaching of which is hereby incorporated into this specification, discloses a process for introducing a polymerisation catalyst into a gas phase polymerisation. The methods disclosed in EP-A-0593083 can be suitably employed in the polymerisation process of the present invention if desired.

Although not usually required, upon completion of polymerisation or copolymerisation, or when it is desired to terminate polymerisation or copolymerisation or at least temporarily deactivate the catalyst or catalyst component of this invention, the catalyst can be contacted with water, alcohols, acetone, or other suitable catalyst deactivators a manner known to persons of skill in the art.

Homopolymerisation of ethylene with the catalysts of the invention may produce so-called "high density" grades of polyethylene. These polymers have relatively high stiffness and are useful for making articles where inherent rigidity is required. Copolymerisation of ethylene with higher 1-olfins (e.g. butene, hexene or octene) can provide a wide variety of copolymers differing in density and in other important physical properties. Particularly important copolymers made by copolymerising ethylene with higher 1-olefins with the catalysts of the invention are the copolymers having a density in the range of 0.91 to 0.93. These copolymers which are generally referred to in the art as linear low density polyethylene, are in many respects similar to the so called low density polyethylene produced by the high pressure free radical catalysed polymerisation of ethylene. Such polymers and copolymers are used extensively in the manufacture of flexible blown film.

Propylene polymers produced by the process of the invention include propylene homopolymer and copolymers of propylene with less than 50 mole % ethylene or other alpha-olefin such as butene-1, pentene-1, 4-methylpentene-1, or hexene-1, or mixtures thereof. Propylene polymers also may include copolymers of propylene with minor amounts of a copolymerizable monomer. Typically, most useful are normally-solid polymers of propylene containing polypropylene crystallinity, random copolymers of propylene with up to about 10 wt. % ethylene, and impact copolymers containing up to about 20 wt. % ethylene or other alpha-olefin. Polypropylene homopolymers may contain a small amount (typically below 2 wt. %) of other monomers to the extent the properties of the homopolymer are not affected significantly.

Propylene polymers may be produced which are normally solid, predominantly isotactic, poly α-olefins. Levels of stereorandom by-products are sufficiently low so that useful products can be obtained without separation thereof. Typically, useful propylene homopolymers show polypropylene crystallinity and have isotactic indices above 90 and many times above 95. Copolymers typically will have lower isotactic indices, typically above 80–85.

Depending upon polymerisation conditions known in the art, propylene polymers with melt flow rates from below 1 to above 1000 may be produced in a reactor. For many applications, polypropylenes with a MFR from 2 to 100 are typical. Some uses such as for spunbonding may use a polymer with an MFR of 500 to 2000.

Depending upon the use of the polymer product, minor amounts of additives are typically incorporated into the polymer formulation such as acid scavengers, antioxidants, stabilizers, and the like. Generally, these additives are incorporated at levels of about 25 to 2000 ppm, typically from about 50 to about 1000 ppm, and more typically 400 to 1000 ppm, based on the polymer.

In use, polymers or copolymers made according to the invention in the form of a powder are conventionally compounded into pellets. Examples of uses for polymer compositions made according to the invention include use to form fibres, extruded films, tapes, spunbonded webs, moulded or thermoformed products, and the like. The polymers may be blown into films, or may be used for making a variety of moulded or extruded articles such as pipes, and containers such as bottles or drums. Specific additive packages for each application may be selected as known in the art. Examples of supplemental additives include slip agents, anti-blocks, anti-stats, mould release agents, primary and secondary anti-oxidants, clarifiers, nucleants, uv stabilizers, and the like. Classes of additives are well known in the art and include phosphite antioxidants, hydroxylamine (such as N,N-dialkyl hydroxylamine) and amine oxide (such as dialkyl methyl amine oxide) antioxidants, hindered amine light (uv) stabilizers, phenolic stabilizers, benzofuranone stabilizers, and the like. Various olefin polymer additives are described in U.S. Pat. Nos. 4,318,845, 4,325,863, 4,590,231, 4,668,721, 4,876,300, 5,175,312, 5,276,076, 5,326,802, 5,344,860, 5,596,033, and 5,625,090.

Fillers such as silica, glass fibers, talc, and the like, nucleating agents, and colourants also may be added to the polymer compositions as known by the art.

The present invention is illustrated in the following Examples.

EXAMPLES

All procedures were conducted under a nitrogen atmosphere unless stated. In Examples 1 to 9, catalyst (2) is a metallocene catalyst. In Examples 10 to 17, it is a Ziegler catalyst.

EXAMPLE 1

Catalyst Containing bis(n-butylcyclopentadienyl) $ZrCl_2$ and 2,6-diacetylpyridinebis(2-methyl anil) iron dichloride (Nominal Composition: 5.54%w/w Al, 0.39%w/w Zr, 0.28%w/w Fe)

To silica (Crosfield grade ES70, previously calcined at 200° C. in flowing $N_2$ for 5 hrs) was added a toluene solution of methylaluminoxane (MAO) containing dissolved bis(n-butylcyclopentadienyl)$ZrCl_2$. The amounts used were 2.5 mmol MAO per gram of silica and 0.05 mmol metallocene per gram silica. The resulting slurry was stirred gently for 1 hour before being dried under reduced pressure to give a free flowing powder.

The supported bis(n-butylcyclopentadienyl)$ZrCl_2$ catalyst (1 g) prepared as described above was placed in a Schlenk tube and 2,6-diacetylpyridinebis(2-methyl anil)iron dichloride (26 mg) was added as a solid. The suspension was heated for 16 hours at 50° C. There was no colouration evident in the supernatant solution above the solid. The produced catalyst was dried at 40° C. under vacuum to leave a dry free flowing powder.

Example 2

Catalyst Containing rac-ethylene bridged bis (indenyl)$ZrCl_2$ and 2,6-diacetylpyridinebis(2-methyl anil)iron dichloride (Nominal Composition: 6.05%w/w Al, 0.53%w/w Zr, 0.08%w/w Fe)

2,6-diacetylpyridinebis(2-methyl anil)iron dichloride (20 mg) and rac-ethylene bridged bis(indenyl)$ZrCl_2$ (74 mg) were placed in a Schlenk tube and toluene (10 ml) added. To this was added a toluene solution of methylaluminoxane (4.5 ml, 1.5M). The mixture was heated at 80° C. for 30 minutes. The solution was added to silica (Crosfield grade ES70X, 2.5 g, previously calcined at 200° C. in flowing $N_2$) and the slurry was heated at 80° C. for 10 minutes. A clear supernatant solution was evident above the silica. The produced catalyst was dried at 80° C. under vacuum to leave a dry free flowing powder.

Example 3

Catalyst Containing bis(1,3 dimethylcyclopentadienyl)$ZrCl_2$ (Nominal Composition: 9.12%w/w Al, 0.36%w/w Zr)

Silica (Crosfield grade ES70X, 4 g, previously calcined at 200° C. in flowing $N_2$, 5 hrs) was placed in a Schlenk tube with toluene (20 ml). To this was added a toluene solution of methylaluminoxane (11.4 ml, 1.5M). The slurry was heated at 60° C. for 30 minutes and then a solution containing dissolved bis(1,3 dimethylcyclopentadienyl)$ZrCl_2$ (70 mg) in toluene (10 ml) was added thereto. The produced catalyst was dried at 60° C. under vacuum to leave a dry free flowing powder.

Example 4

Catalyst Containing 2,6-diacetylpyridinebis(2-methyl anil)iron dichloride and bis(1,3 dimethylcyclopentadienyl)$ZrCl_2$ (Nominal Composition: 6.14%w/w Al, 0.65%w/w Zr, 0.25%w/w Fe)

2,6-diacetylpyridinebis(2-methyl anil)iron dichloride (60 mg) bis(1,3 dimethylcyclopentadienyl)$ZrCl_2$ (74 mg) were placed in a Schlenk tube and toluene (10 ml) added. To this was added a toluene solution of methylaluminoxane (4.5 ml, 1.5M). The produced solution was added to silica (Crosfield grade ES70X, 2.5 g, previously calcined at 200° C. in flowing $N_2$) and left for 60 minutes with occasional shaking. A clear supernatent solution was evident above the silica. The produced catalyst was dried at room temperature under vacuum to leave a dry free flowing powder.

Example 5

Catalyst Containing 2,6-diacetylpyridinebis(2-methyl anil)iron dichloride and bis(1,3 dimethylcyclopentadienyl)$ZrCl_2$ (Nominal Composition: 9.08%w/w Al, 0.36%w/w Zr, 0.05%w/w Fe)

2,6-diacetylpyridinebis(2-methyl anil)iron dichloride (5 mg) was mixed with catalyst SRP293/25 (1 g) in a Schlenk tube. To this was added toluene (5 ml). The slurry was shaken for several minutes and then heated at 65° C. for 2 hours. The produced catalyst was dried at 65° C. under vacuum to leave a dry free flowing powder.

Example 6

Catalyst Containing 2,6-diacetylpyridinebis(2-methyl anil)iron dichloride and bis(1,3 dimethylcyclopentadienyl)$ZrCl_2$ (Nominal Composition: 9.12%w/w Al, 0.36%w/w Zr, 0.01%w/w Fe)

2,6-diacetylpyridinebis(2-methyl anil)iron dichloride (1 mg) was mixed with the catalyst of Example 3 above (1 g) in a Schlenk tube. To this was added toluene (5 ml). The slurry was shaken for several minutes and then heated at 65° C. for 30 minutes. The produced catalyst was dried at 65° C. under vacuum to leave a dry free flowing powder.

Example 7

Catalyst Containing 2,6-diacetylpyridinebis(2-methyl anil)iron dichloride and bis(1,3 dimethylcyclopentadienyl)ZrCl$_2$ (Nominal Composition: 9.12%w/w Al, 0.36%w/w Zr, 0.005%w/w Fe)

2,6-diacetylpyridinebis(2-methyl anil)iron dichloride (0.5 mg) was mixed with catalyst SRP293/25 (1 g) in a Schlenk tube. To this was added toluene (5 ml). The slurry was shaken for several minutes and then heated at 65° C. for 30 minutes. The produced catalyst was dried at 65° C. under vacuum to leave a dry free flowing powder.

Example 8

Catalyst Containing 2,6-diacetylpyridinebis(2-methyl anil)iron dichloride (Nominal Composition: 9.31%w/w Al, 0.012%w/w Fe)

Silica (Crosfield grade ES70X, 20.5 g, previously calcined at 200° C. in flowing N$_2$, >5 hrs) was placed in a Schlenk tube with sufficient toluene to make a slurry. To this was added a toluene solution of methylaluminoxane (41.4 ml, 1.5M). The slurry was heated at 80° C. for 60 minutes. The toluene was removed under vacuum, at 80° C., to leave a dry free flowing powder. To a portion of the MAO/ES70X (1 g) was added 2,6-diacetylpyridinebis(2-methyl anil)iron dichloride (1 mg) followed by toluene (5 ml). The mixture was shaken occasionally for 2 hours and then dried under vacuum at room temperature.

Example 9

Catalyst Containing Physical Mixture of 2,6-diacetylpyridinebis(2-methyl anil)iron dichloride and bis(1,3 dimethylcyclopentadienyl)ZrCl$_2$ A physical mixture containing 0.2 g of the catalyst of Example 3 and 0.2 g of the catalyst of Example 8 was made.

Polymerisations

A 3 liter reactor was baked out under flowing nitrogen for at least 1 hour at 80° C. Powdered sodium chloride (300 g, predried under vacuum, 160° C.,>4 hours) was added. The sodium chloride was used as a fluidisable/stirrable start-up charge powder for the gas phase polymerisation. Trimethyl aluminium (3 ml, 2M in hexanes) was added to the reactor which was boxed in nitrogen. The alkyl aluminium was allowed to scavenge for poisons at 78° C. in the reactor for at least 30 minutes before being vented using 4×4 bar nitrogen purges. The gas phase was composed with 8 bar ethylene prior to injection of the catalyst. The catalyst (0.20 g) was injected under nitrogen and the temperature then adjusted to 80° C. The polymerisation tests were allowed to continue for between 40 and 160 minutes before being terminated by purging the ethylene from the reactor with nitrogen and reducing the temperature to <30° C. The produced polymer was washed with water to remove the sodium chloride, then with acidified methanol (50 ml HCl/ 2.5 L methanol) and finally with water/ethanol (4:1 v/v). The polymer was dried under vacuum, at 40° C., for 16 hours. The results of the polymerisations are set out in the following Table.

| Catalyst Example | 1 | 2 | 3 | 4 | 5 | 6 | 7 | 9 |
|---|---|---|---|---|---|---|---|---|
| Catalyst wt (g) | 0.20 | 0.20 | 0.20 | 0.21 | 0.22 | 0.20 | 0.20 | 0.4 |
| Run Time (min) | 60 | 90 | 40 | 60 | 60 | 160 | 150 | 80 |
| Polymer (g) | 59 | 28 | 18.5 | 52 | 100 | 164 | 140 | 132 |
| MI (2.16 kg, g/10 min) | 3.37 | 31.2 | — | — | — | 0.40 | — | — |
| HLMI (21.6 kg, g/10 min) | 67.8 | — | — | — | — | 3.16 | 0.36 | — |
| Mw (GPC) | 93000 | 50000 | 368000 | 930 | 40000 | 238000 | 325000 | — |
| Mn (GPC) | 51000 | 46000 | 98000 | 280 | 840 | 19000 | 69000 | — |
| Mw/Mn | 13.4 | 10.9 | 3.8 | 3.4 | 47.8 | 12.7 | 4.7 | — |
| SCB* (/1000C) | 15.7 | 22.6 | 0.1 | 8.2 | 35.6 | 14.5 | 5.1 | — |
| MPt (° C.) | 115.9 | 125.1 | 134.7 | — | 121.3 | 116.3 | 125.0 | 114.8 |
| Crystallinity (%) | 44 | 29.8 | 62.7 | — | 22.6 | 44.5 | 51.6 | 45.1 |
| Density (g/cm$^3$) | 0.917 | — | — | — | 0.929 | 0.917 | 0.927 | — |

*Short chain branching (SCB) by 13C NMR (includes Me, Et, Bu, hexyl and longer branches)

Insitu LLDPE Using Zeigler Catalysts

Example 10

Titanium Ziegler Catalyst (Composition: 0.96% w/w Ti)

Silica (20 kg), grade ES 70 supplied by Crosfield, which had been dried at 800° C. for 5 hours in flowing nitrogen, was slurried in hexane (110 liters) and hexamethyldisilazane (30 moles), supplied by Fluka, was added with stirring at 50° C. Dry hexane (120 liters) was added with stirring, the solid allowed to settle, the supernatant liquid removed by decantation and further dry hexane (130 liters) was added with stirring. The hexane washing was repeated a further 3 times. Dibutylmagnesium (30 moles), supplied by FMC, was added and stirred for 1 hour at 50° C. Tertiary butyl chloride (60 moles) was added and stirred for 1 hour at 50° C. To this slurry was added an equimolar mixture of titanium tetrachloride (3 moles), and titanium tetra-n-propoxide (3 moles)

with stirring at 50° C. for 2 hours, followed by 5 washings with dry hexane (130 liters). The slurry was dried under a flowing nitrogen stream to give a solid, silica supported Ziegler catalyst component.

Example 11

Catalyst Containing 2,6-diacetylpyridinebis(2-methyl anil)iron dichloride and titanium Ziegler Catalyst (Nominal Composition: 0.87% w/w Ti, 0.052% w/w Fe, 4.38% w/w Al)

The catalyst of Example 10 (2 g) was slurried in toluene (10 ml). A solution of MAO in toluene (2.5 ml, 1.5M MAO) was added and allowed to react for 30 minutes. A slurry of 2,6-diacetylpyridinebis(2-methyl anil)iron dichloride (10 mg in toluene, 2 ml) was then added and allowed to react for 2 hours at room temperature. During the reactions the reactants were shaken occasionally. The catalyst was dried under vacuum at room temperature. A free flowing powder was formed.

Example 12

Catalyst Containing 2,6-diacetylpyridinebis(2-methyl anil)iron dichloride and titanium Ziegler Catalyst (Nominal Composition: 0.83% w/w Ti, 0.60% w/w Fe, 4.19% w/w Al)

The catalyst of Example 11 (1.8 g) was mixed with 2,6-diacetylpyridinebis(2-methyl anil)iron dichloride (100 mg) and slurried in toluene (10 ml). Reaction was allowed to take place over 1 hour and the catalyst was dried under vacuum at room temperature.

Example 13

Catalyst Containing Physical Mixture of 2,6-diacetylpyridinebis(2-methyl anil)iron dichloride and titanium Ziegler Catalyst A physical mixture of the catalyst of Example 10 (0.2 g) and that of Example 8 (0.8 g) was made.

Example 14

Catalyst Containing 2,6-diacetylpyridinebis(2-methyl anil)iron dichloride (Nominal Composition: 9.31%w/w Al, 0.012%w/w Fe)

Silica (Crosfield grade ES70X, 20.5 g, previously calcined at 200° C. in flowing $N_2$, >5 hrs) was placed in a Schlenk tube with sufficient toluene to make a slurry. To this was added a toluene solution of methylaluminoxane (41.4 ml, 1.5M). The slurry was heated at 80° C. for 60 minutes. The toluene was removed under vacuum, at 80° C., to leave a dry free flowing powder.

To a portion of the MAO/ES70X (1 g) was added 2,6-diacetylpyridinebis(2-methyl anil)iron dichloride (1 mg) followed by toluene (5 ml). The mixture was shaken occasionally for 2 hours and then dried under vacuum at room temperature.

Example 15

Catalyst Containing Physical Mixture of 2,6-diacetylpyridinebis(2-methyl anil)iron dichloride catalyst and titanium Ziegler Catalyst A physical mixture of the catalyst of Example 10 (0.2 g) and that of Example 14 (0.8 g) was made.

Example 16

Catalyst Containing 2,6-diacetylpyridinebis(2-methyl anil)iron dichloride and titanium Ziegler Catalyst (Nominal Composition: 0.87% w/w Ti, 0.062% w/w Fe, 4.38% w/w Al)

The catalyst of Example 10 (2 g) and 2,6-diacetylpyridinebis(2-methyl anil)iron dichloride (10 mg) were mixed together and then toluene added (10 ml). A solution of MAO in toluene (2.5 ml, 1.5M MAO) was added and allowed to react for 90 minutes at room temperature. During the reaction the reactants were shaken occasionally. The catalyst was dried under vacuum at room temperature. A free flowing powder was formed.

Example 17

Catalyst Containing 2,6-diacetylpyridinebis(2-methyl anil)iron dichloride and titanium Ziegler Catalyst (Nominal Composition: 0.86% w/w Ti, 0.134% w/w Fe, 4.38% w/w Al)

The catalyst of Example 10 (2 g) and 2,6-diacetylpyridinebis(2-methyl anil)iron dichloride (26 mg) were mixed together and then toluene added (10 ml). A solution of MAO in toluene (2.5 ml, 1.5M MAO) was added and allowed to react for 90 minutes at room temperature. During the reaction the reactants were shaken occasionally. The catalyst was dried under vacuum at room temperature. A free flowing powder was formed.

Polymerisations

A 3 liter reactor was baked out under flowing nitrogen for at least 1 hour at 80° C. Powdered sodium chloride (300 g, predried under vacuum, 160° C., >4 hours) was added. The sodium chloride was used as a fluidisable/stirrable start-up charge powder for the gas phase polymerisation. Trimethyl aluminium (3 ml, 2M in hexanes) was added to the reactor which was boxed in nitrogen. The alkyl aluminium was allowed to scavenge for poisons at 78° C. in the reactor for at least 30 minutes before being vented using 4×4 bar nitrogen purges. The gas phase was composed as detailed in the table below with triethylaluminium (TEA), 8 bar ethylene and hydrogen, as detailed in the table below, prior to injection of the catalyst. The catalyst was injected under nitrogen and the temperature then adjusted to 80° C. The polymerisation tests were allowed to continue for between 40 and 150 minutes before being terminated by purging the ethylene from the reactor with nitrogen and reducing the temperature to <30° C. The produced polymer was washed with water to remove the sodium chloride, then with acidified methanol (50 ml HCl/2.5L methanol) and finally with water/ethanol (4:1 v/v). The polymer was dried under vacuum, at 40° C., for 16 hours. The results of the polymerisations are set out in the following Table.

| Catalyst Example | 11 | 12 | 13 | 15 | 16 | 17 | 17 |
|---|---|---|---|---|---|---|---|
| Total Catalyst Wt (g) | 0.20 | 0.20 | 1 | 1 | 0.22 | 0.22 | 0.22 |
| TEA (mmol) | 2 | 2 | 2 | 2 | 0 | 0 | 0 |
| Hydrogen (bar) | 2 | 2 | 2 | 0 | 2 | 2 | 0 |
| Run Time (min) | 60 | 40 | 60 | 30 | 90 | 150 | 250 |
| Polymer (g) | 55 | 5 | 93 | 104 | 150 | 115 | 179 |
| MI (2.16 kg, g/10 min) | — | — | — | — | 2.27 | — | — |
| HLMI (21.6 kg, g/10 min) | — | — | — | — | 117.4 | — | — |
| Mw (GPC) | 224000 | 169000 | — | 873000 | 119000 | 58000 | 521000 |
| Mn (GPC) | 41000 | 9200 | — | 98000 | 3000 | 900 | 870 |
| Mw/Mn | 5.5 | 18.4 | — | 8.9 | 39.9 | 67.7 | 599 |
| Me (/1000C) | — | ND | — | ND | ND | 0.7 | ND |
| Et (/1000C) | — | 0.8 | — | 1.2 | 3.8 | 8.1 | 6.4 |
| Bu (/1000C) | — | 0.4 | — | 0.7 | 3.0 | 5.2 | 5.2 |
| Hexyl+ (/1000C) | — | 0.8 | — | 1.1 | 4.0 | 7.3 | 6.5 |
| MPt (° C.) | 134.8 | 131.8 | 133.3 | 129.6 | 127.2 | 123.1 | — |
| Crystallinity (%) | 65.5 | 62.7 | 67.2 | 58.1 | 58.8 | 45.6 | — |
| Density (g/cm³) | — | — | — | 0.938 | 0.928 | 0.925 | — |

What is claimed is:

1. A polymerization catalyst comprising (1) a catalyst having a compound of the Formula (I):

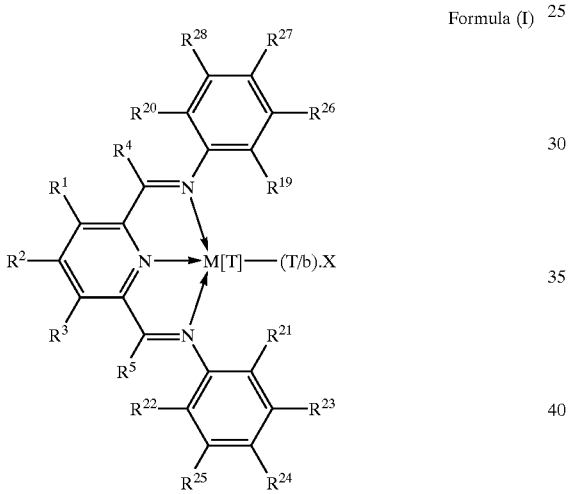

Formula (I)

wherein M is Fe[II], Fe[III], Co[I], Co[II], Co[III], Mn[I], Mn[II], Mn[III], Mn[IV], Ru[II], Ru[III] or Ru[IV]; X represents an atom or group covalently or ionically bonded to the transition metal M; T is the oxidation state of the transition metal M and b is the valency of the atom or group X; $R^1$ to $R^5$ and $R^{23}$ to $R^{28}$ are independently selected from the group consisting of hydrogen, halogen, hydrocarbyl, substituted hydrocarbyl, heterohydrocarbyl and substituted heterohydrocarbyl; $R^{19}$ is an optionally substituted primary, secondary or tertiary hydrocarbyl or heterohydrocarbyl group; when $R^{19}$ is an optionally substituted primary hydrocarbyl or heterohydrocarbyl group, one of $R^{20}$ to $R^{22}$ is hydrogen and the others of $R^{20}$ to $R^{22}$ are each independently hydrogen, halogen or an optionally substituted primary hydrocarbyl or heterohydrocarbyl group; when $R^{19}$ is an optionally substituted secondary hydrocarbyl or heterohydrocarbyl group, two of $R^{20}$ to $R^{22}$ are hydrogen and the other of $R^{20}$ to $R^{22}$ is hydrogen, halogen or an optionally substituted primary or secondary hydrocarbyl or heterohydrocarbyl group; when $R^{19}$ is an optionally substituted tertiary hydrocarbyl or heterohydrocarbyl group, $R^{20}$ to $R^{22}$ are all hydrogen; and any two or more of $R^{19}$ to $R^{28}$ can be linked to form one or more cyclic substituents; and (2) a further catalyst for the polymerization of 1-olefins which is different from catalyst (1); with the proviso that when catalyst (1) is 2,6-diacetylpyridinebis(2-methylanil)FeCl$_2$, then catalyst (2) is not one of 1,1-dimethylsilyl(1-tetramethylcyclopentadienyl)(1-t-butylamino)titanium dichloride, propane-2,2-[(cyclopentadienyl)(1-fluorenyl)]zirconium dichloride, butane-2,3-(2,6-dimethylphenyl-1-imino)nickel dibromide, or 2,6-diacetylpyridinebis(2,4,6-trimethylanil)FeCl$_2$.

2. The catalyst of claim 1, wherein catalyst (2) comprises a Ziegler Natta catalyst, a Phillips type (chromium oxide) catalyst, a metallocene catalyst, a monocyclopentadienyl constrained geometry type catalyst or a bidentate α-diimine late transition metal catalyst, and wherein the molar ratio of metal in catalyst (1) to metal in catalyst (2) is from 1:10000 to 2:1.

3. The catalyst of claim 2, wherein the molar ratio of metal in catalyst (1) to metal in catalyst (2) is from 1:1000 to 1:1.

4. The catalyst of claim 1, wherein the catalyst is for the polymerization of ethylene to form a polyethylene product and the molar ratio of metal in catalyst (1) to metal in catalyst (2) is such that the final polyethylene product contains less than 1 wt % of low $M_w$ waxes, such that the GPC of the product contains no peak at an $M_w$ of less than 5000.

5. The catalyst of claim 1, wherein in the compound of formula (I), when $R^{19}$ is an optionally substituted primary hydrocarbyl or heterohydrocarbyl group, $R^{21}$ is an optionally substituted primary hydrocarbyl or heterohydrocarbyl group and $R^{20}$ and $R^{22}$ are both hydrogen.

6. The catalyst of claim 1, wherein in the compound of formula (I), when $R^{19}$ is an optionally substituted secondary hydrocarbyl or heterohydrocarbyl group, $R^{21}$ is an optionally substituted primary or secondary hydrocarbyl or heterohydrocarbyl group and $R^{20}$ and $R^{22}$ are both hydrogen.

7. The catalyst of claim 1, wherein in the compound of formula (I), $R^{19}$ and $R^{21}$ are both hydrogen, and $R^{20}$ and $R^{22}$ are independently methyl, ethyl, trifluoromethyl, propyl, or isopropyl.

8. The catalyst of claim 1, wherein in the compound of formula (I), $R^1$, $R^2$ and $R^3$ and $R^{23}$ to $R^{28}$ are all hydrogen.

9. The catalyst of claim 1, wherein in the compound of formula (I), $R^4$ and $R^5$ are independently methyl or hydrogen.

10. The catalyst of claim 1, wherein in the compound of formula (I), X is selected from the group consisting of halide, sulphate, nitrate, thiolate, thiocarboxylate, $BF_4$, $PF_6$, hydride, hydrocarbyloxide, carboxylate, hydrocarbyl, substituted hydrocarbyl, substituted heterohydrocarbyl, and β-diketonates.

11. The catalyst of claim 10, wherein in the compound of formula (I), X is selected from the group consisting chloride, bromide, methyl, ethyl, propyl, butyl, octyl, decyl, phenyl, benzyl, methoxide, ethoxide, isopropoxide, tosylate, triflate, formate, acetate, phenoxide and benzoate.

12. The catalyst of claim 1, wherein compound (2) is either a Ziegler-Natta catalyst, 2,6-diacetylpyridinebis(2,4,6-trimethyl anil)$FeCl_2$, or a metallocene represented by the general formula:

$$(C_5R_n)_y Z_x (C_5R_m) ML_{(4-y-1)}$$

where $(C_5R_x)_n$ and $(C_5R_m)$ are cyclopentadienyl ligands,

R is hydrogen, alkyl, aryl, or alkenyl,

M is a Group IVA metal,

Z is a bridging group,

L is an anionic ligand, and

Y is 0, 1 or 2, n and m are 1–5, and x is 0 or 1.

13. The catalyst of claim 1, further comprising an activating quantity of at least one activator compound.

14. The catalyst of claim 13, wherein the activator is selected from the group consisting of organoaluminium compounds, hydrocarbylboron compounds and salts of a cationic oxidizing agent and a non-coordinating compatible anion.

15. The catalyst of claim 14, wherein the activator is selected from the group consisting of trimethylaluminium, triethyaluminium, tri-isobutylaluminium, tri-n-octylaluminium, methylaluminium dichloride, ethylaluminium dichloride, dimethylaluminium chloride, diethylaluminium choride, ethylaluminiumsesquichloride, methylaluminiumsesquichloride, and alumoxanes.

16. The catalyst of claim 12, further comprising a neutral Lewis base.

17. The catalyst of claim 16, wherein the neutral Lewis base is selected from the group consisting of alkenes (other than 1-olefins), alkynes, primary amines, secondary amines, tertiary amines, amides, phosphoramides, phosphines, phosphites, ethers, thioethers, nitrites, esters, ketones, aldehydes, carbon monoxide, carbon dioxide, sulphoxides, sulphones and boroxines.

18. The catalyst of claim 13, which is supported on a support material selected from the group consisting of silica, alumina, $MgCl_2$, zirconia, polyethylene, polypropylene, polystyrene, and poly(aminostyrene).

19. A process for the polymerization or copolymerization of 1-olefins, comprising contacting a monomeric olefin under polymerization conditions with a catalyst as defined in claim 1.

20. The process of claim 19, comprising the steps of:
a) preparing a prepolymer-based catalyst by contacting one or more 1-olefins with the catalyst, and
b) contacting the prepolymer-based catalyst with one or more 1-olefins.

21. The process of claim 19, wherein the polymerization is conducted in the presence of hydrogen as a molecular weight modifier.

22. The process of claim 19, wherein the polymerization conditions are solution phase, slurry phase or gas phase.

23. The process of claim 22, wherein the polymerization is conducted under gas phase fluidized bed conditions.

24. The process of claim 22, wherein the polymerization is conducted in slurry phase in an autoclave or continuous loop reactor.

25. The process of claim 19, wherein the monomeric olefin polymerized is ethylene only.

* * * * *